United States Patent
Kumano

(10) Patent No.: US 10,282,126 B2
(45) Date of Patent: May 7, 2019

(54) INFORMATION PROCESSING APPARATUS AND METHOD FOR DEDUPLICATION

(71) Applicant: FUJITSU LIMITED, Kawasaki-shi, Kanagawa (JP)

(72) Inventor: Tatsuo Kumano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 39 days.

(21) Appl. No.: 15/489,264

(22) Filed: Apr. 17, 2017

(65) Prior Publication Data
US 2017/0322747 A1    Nov. 9, 2017

(30) Foreign Application Priority Data
May 9, 2016 (JP) ................................. 2016-094025

(51) Int. Cl.
*G06F 3/06* (2006.01)
(52) U.S. Cl.
CPC .......... *G06F 3/0641* (2013.01); *G06F 3/0608* (2013.01); *G06F 3/0652* (2013.01); *G06F 3/0659* (2013.01); *G06F 3/0683* (2013.01)
(58) Field of Classification Search
CPC ................. G06F 3/0641; G06F 3/0608; G06F 17/30303; G06F 2201/81; G06F 3/0652; G06F 3/0659; G06F 3/0683; G06F 3/067
See application file for complete search history.

(56) References Cited

U.S. PATENT DOCUMENTS

| 8,799,601 B1* | 8/2014 | Chen ..................... G06F 3/0608 711/161 |
| 2009/0217091 A1 | 8/2009 | Miyamoto et al. |
| 2014/0059016 A1* | 2/2014 | Tsuchiya ............... G06F 3/0641 707/692 |
| 2018/0307433 A1* | 10/2018 | Takaoka ................... G06F 3/06 |

FOREIGN PATENT DOCUMENTS

| JP | 2009-129076 | 6/2009 |
| JP | 2009-205201 | 9/2009 |
| JP | 2014-41452 | 3/2014 |

* cited by examiner

*Primary Examiner* — Zhuo H Li
(74) *Attorney, Agent, or Firm* — Staas & Halsey LLP

(57) ABSTRACT

An information processing apparatus includes a memory and a processor coupled to the memory. The processor is configured to calculate, when writing a first data block at a first address on a storage, a first index value corresponding to a number of times of writing data at the first address. The processor is configured to determine, on basis of the first index value, whether to perform or hold deduplication on the first data block. The processor is configured to switch between performing and holding the deduplication on the first data block depending on a result of the determination.

11 Claims, 16 Drawing Sheets

FIG. 1A RELATED ART
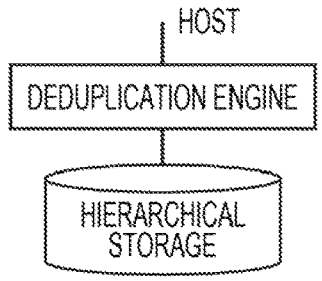
FIG. 1F RELATED ART
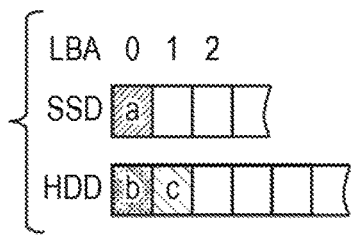
FIG. 1B RELATED ART
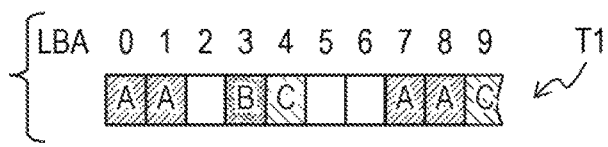
FIG. 1C RELATED ART
| HASH VALUE | LBA |
|---|---|
| A | 0 |
| B | 1 |
| C | 2 |
T2
FIG. 1G RELATED ART
| HASH VALUE | LBA | REFERENCE COUNT |
|---|---|---|
| A | 0 | 4 |
| B | 1 | 0 |
| C | 2 | 1 |
T2
FIG. 1D RELATED ART
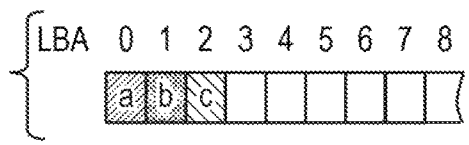
FIG. 1E RELATED ART
| LBA | ACCESS COUNT | DEVICE TYPE | LBA ON DEVICE |
|---|---|---|---|
| 0 | 20 | SSD | 0 |
| 1 | 5 | HDD | 0 |
| 2 | 2 | HDD | 1 |
T4

FIG. 2A RELATED ART
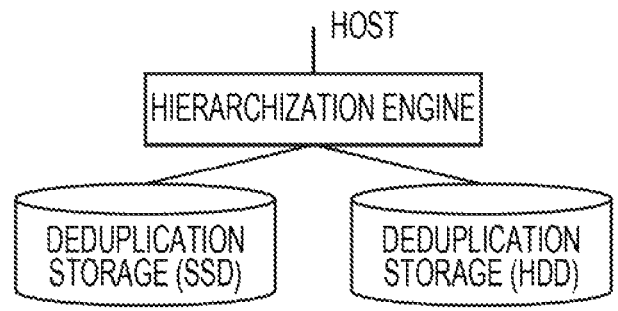
FIG. 2B RELATED ART
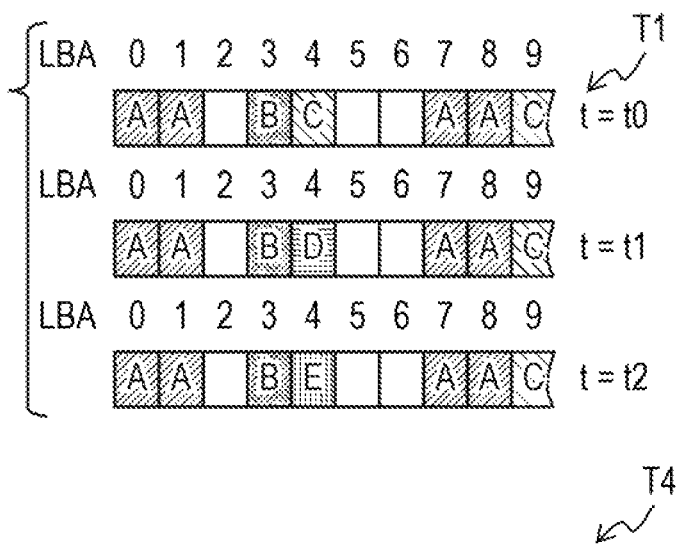
FIG. 2C RELATED ART
| LBA | ACCESS COUNT | DEVICE TYPE | LBA ON DEVICE |
|---|---|---|---|
| 0 | 1 | HDD | 0 |
| 1 | 2 | SSD | 0 |
| 2 | 0 | — | — |
| 3 | 1 | HDD | 1 |
| 4 | 3 | SSD | 1 |
| 5 | 0 | — | — |
| 6 | 0 | — | — |
| 7 | 1 | HDD | 2 |
| 8 | 2 | SSD | 2 |
| 9 | 1 | HDD | 3 |

FIG. 2D1 RELATED ART
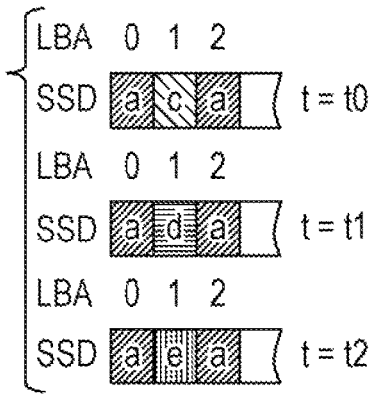
FIG. 2E1 RELATED ART
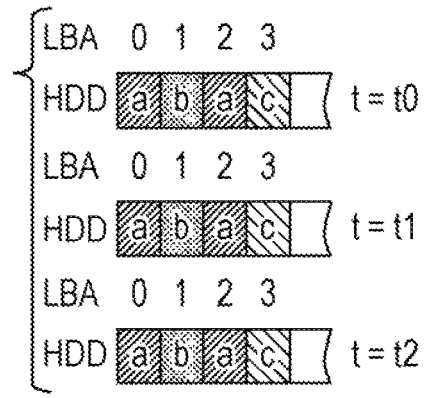
FIG. 2D2 RELATED ART
| HASH VALUE | LBA |
|---|---|
| A | 0 |
| C | 1 |
| D | 2 |
| E | 3 |
T2
FIG. 2E2 RELATED ART
| HASH VALUE | LBA |
|---|---|
| A | 0 |
| B | 1 |
| C | 2 |
T2
FIG. 2D3 RELATED ART
FIG. 2E3 RELATED ART
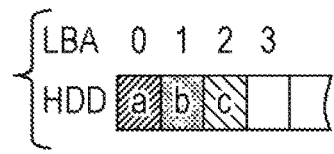

FIG. 3

| TIME | ADDRESS | DATA BLOCK |
|---|---|---|
| t0 | 0 | a |
| t1 | 0 | b |
| t2 | 0 | c |
| t3 | 0 | d |
| t4 | 0 | e |
| t5 | 0 | f |

FIG. 4

| ADDRESS | DATA BLOCK |
|---|---|
| 0 | a |
| 1 | b |
| 2 | c |
| 3 | d |
| 4 | e |
| 5 | f |

FIG. 5

| ADDRESS | DATA BLOCK |
|---|---|
| 0 | a |
| 1 | b |
| 2 | c |
| 3 | a |
| 4 | a |
| 5 | a |

FIG. 6

| ADDRESS | DATA BLOCK | ACCESS COUNT |
|---|---|---|
| 0 | a | 1 |
| 1 | b | 2 |
| 2 | c | 3 |
| 3 | a | 1 |
| 4 | a | 1 |
| 5 | a | 1 |

FIG. 7

| ADDRESS | DATA BLOCK | ACCESS COUNT | DEVICE TYPE |
|---|---|---|---|
| 0 | a | 1 | LOW-SPEED (HDD) |
| 1 | b | 2 | HIGH-SPEED (SSD) |
| 2 | c | 3 | HIGH-SPEED (SSD) |
| 3 | a | 1 | LOW-SPEED (HDD) |
| 4 | a | 1 | LOW-SPEED (HDD) |
| 5 | a | 1 | LOW-SPEED (HDD) |

FIG. 8

| ADDRESS | DATA BLOCK | ACCESS COUNT |
|---|---|---|
| 0 | b | 2 |
| 1 | c | 3 |

FIG. 9

| ADDRESS | DATA BLOCK | ACCESS COUNT |
|---|---|---|
| 0 | a | 4 |

| ADDRESS | INDEX VALUE OF WRITE COUNT |
|---|---|
| 4 | 10.7 |
| 2 | 2.2 |
| 9 | 1.4 |
| ... | ... |

⇒

T3

| ADDRESS | INDEX VALUE OF WRITE COUNT |
|---|---|
| 4 | 10.593 |
| 2 | 2.178 |
| 10 | 1 |
| ... | ... |

| ADDRESS | INDEX VALUE OF WRITE COUNT |
|---|---|
| 4 | 14 |
| 2 | 4 |
| 9 | 2 |
| ... | ... |

⇒

T3'

| ADDRESS | INDEX VALUE OF WRITE COUNT |
|---|---|
| 4 | 14 |
| 2 | 4 |
| 10 | 3 |
| ... | ... |

| HASH VALUE | ADDRESS PROVIDED TO DEDUPLICATION ENGINE BY HIERARCHICAL STORAGE |
|---|---|
| A | 0 |
| B | 1 |
| C | 2 |
| D | 3 |
| E | 4 |
| F | 5 |

FIG. 21

| ADDRESS PROVIDED TO DEDUPLICATION ENGINE BY HIERARCHICAL STORAGE | DATA BLOCK |
|---|---|
| 0 | a |
| 1 | b |
| 2 | c |
| 3 | d |
| 4 | e |
| 5 | f |
| 6 | |
| 7 | |
| 8 | |
| ... | ... |

FIG. 22

| ADDRESS PROVIDED TO DEDUPLICATION ENGINE BY HIERARCHICAL STORAGE | ACCESS COUNT | DEVICE TYPE | ADDRESS ON DEVICE |
|---|---|---|---|
| 0 | 20 | SSD | 0 |
| 1 | 2 | HDD | 0 |
| 2 | 2 | HDD | 1 |
| 3 | 1 | HDD | 2 |
| 4 | 1 | HDD | 3 |
| 5 | 3 | HDD | 4 |
| 6 | | | |
| 7 | | | |
| 8 | | | |
| ... | ... | ... | ... |

FIG. 23

| ADDRESS PROVIDED TO HOST | HASH VALUE OR ADDRESS ON HIERARCHICAL STORAGE |
|---|---|
| 0 | 3 |
| 1 | A |
| 2 | |
| 3 | B |
| 4 | C |
| 5 | |
| 6 | |
| 7 | A |
| 8 | A |
| 9 | C |
| ... | ... |

FIG. 24

| ADDRESS PROVIDED TO HOST | INDEX VALUE OF WRITE COUNT |
|---|---|
| 0 | 6 |
| 1 | 1.2 |
| 3 | 0.9 |
| 4 | 0.8 |
| 7 | 1.3 |
| 8 | 1.2 |
| 9 | 1.1 |

INFORMATION PROCESSING APPARATUS AND METHOD FOR DEDUPLICATION

CROSS-REFERENCE TO RELATED APPLICATION

This application is based upon and claims the benefit of priority of the prior Japanese Patent Application No. 2016-094025, filed on May 9, 2016, the entire contents of which are incorporated herein by reference.

FIELD

The embodiment discussed herein is related to an information processing apparatus and a method for deduplication.

BACKGROUND

In recent years, with an increase of data to be processed, the cost for a storage for storing the data and its backup data also increases. There is a case where identical data blocks are repeatedly stored in the storage.

Therefore, it has been proposed to suppress the identical data blocks from being stored in the storage by a deduplication technique to suppress a cost for the storage.

In the deduplication technique described above, when wiring a data block to the storage, it is detected whether or not there is an identical data block to the data block to be written, using a hash value, for example. In a case where there is no identical data block, the data block to be written is written in the storage. In a case where there is an identical data block, duplication of the identical data block is avoided by not writing the data block to be written to the storage.

A reference frequency of information such as data blocks or the like generally tends to decrease when a predetermined period of time has elapsed after the information is generated. With this tendency, in recent years, along with an increase in opportunities to utilize big data, a case occurs in which data is stored in a high-performance storage without being referenced for a long period of time and a decrease in performance of the storage is caused.

Therefore, it has been proposed to improve the performance of the storage by a technique (hierarchization technique) for hierarchizing data arrangement by using a hierarchical storage including a plurality of storage devices with different performances. As the plurality of storage devices with different performances, for example, a storage class memory (SCM), a solid state drive (SSD), and a hard disk drive (HDD) are used.

In the hierarchization technique described above, data access to the storage is monitored for each of addresses (that is, data blocks stored at the address) and an access frequency to each address is detected. Then, data blocks are rearranged among the various storage devices on the basis of the detected access frequency and a predetermined policy. For example, data blocks of which access frequency is high are arranged in a storage device with high processing speed, and data blocks of which access frequency is low are arranged in an inexpensive storage device with slow processing speed.

Related techniques are disclosed in, for example, Japanese Laid-open Patent Publication No. 2014-41452, Japanese Laid-open Patent Publication No. 2009-205201, and Japanese Laid-open Patent Publication No. 2009-129076.

In a case where both of the deduplication technique and the hierarchization technique are applied to the storage, for example, the hierarchization technique is applied after the deduplication technique is applied.

In a case where writing of a data block is performed at a specific address many times, since an appearance frequency (access frequency) of each of the data blocks is low, each of the data blocks is arranged by the hierarchization technique on a storage device with slow processing speed. In addition, although the data block is to be overwritten also on the actual storage device intrinsically, since contents of the data blocks are different from each other, a new address is assigned to each of the data blocks by the deduplication technique, and each of the data blocks is written into the storage device. For this reason, a storage area in the storage is wastefully used, the processing amount of garbage collection increases, and performance of the storage is reduced.

The garbage collection is a function of releasing an area storing an unnecessary data block, for example, by discarding each of the data blocks which are wastefully written at the new address as described above, as an unnecessary data block.

SUMMARY

According to an aspect of the present invention, provided is an information processing apparatus including a memory and a processor coupled to the memory. The processor is configured to calculate, when writing a first data block at a first address on a storage, a first index value corresponding to a number of times of writing data at the first address. The processor is configured to determine, on basis of the first index value, whether to perform or hold deduplication on the first data block. The processor is configured to switch between performing and holding the deduplication on the first data block depending on a result of the determination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A to 1G are diagrams illustrating a process according to a related technique in a case where a hierarchization process is performed after a deduplication process;

FIGS. 2A to 2E3 are diagrams illustrating a process according to a related technique in a case where a deduplication process is performed after a hierarchization process;

FIG. 3 is a diagram illustrating an example of successively writing data blocks at a same address in the process illustrated in FIGS. 2A to 2E3;

FIG. 4 is a diagram illustrating an example of data blocks arranged in a high-speed device in the process illustrated in FIGS. 2A to 2E3;

FIG. 5 is a diagram illustrating an example in which identical data blocks are written at a plurality of addresses in the process illustrated in FIGS. 2A to 2E3;

FIG. 6 is a diagram illustrating an example in which identical data blocks are written at a plurality of addresses and an access count for each address is small in the process illustrated in FIGS. 2A to 2E3;

FIG. 7 is a diagram illustrating an example in which assignment of devices is performed with respect to the example illustrated in FIG. 6 in the process illustrated in FIGS. 2A to 2E3;

FIG. 8 is a diagram illustrating a relationship between an exemplary arrangement of data blocks in a high-speed device and an access count in the process illustrated in FIGS. 2A to 2E3;

FIG. 9 is a diagram illustrating a relationship between an exemplary arrangement of data blocks in a low-speed device and an access count in the process illustrated in FIGS. 2A to 2E3;

FIG. 11 is a diagram illustrating an example of a correspondence between an address and an index value of a write count according to the present embodiment;

FIG. 12 is a diagram illustrating an example of a correspondence between an address and an index value of a write count according to the present embodiment;

FIG. 20 is a diagram illustrating an example of a correspondence between a hash value and a deduplication address in a deduplication engine according to a related technique;

FIG. 21 is a diagram illustrating an example of a correspondence between a deduplication address and a data block according to a related technique;

FIG. 22 is a diagram illustrating an example of a data structure in a hierarchical storage according to a related technique;

FIG. 23 is a diagram illustrating an example of a correspondence between an address and a hash value or an address on a hierarchical storage in a deduplication engine according to the present embodiment;

FIG. 24 is a diagram illustrating an example of a correspondence between an address and an index value of a write count according to the present embodiment;

DESCRIPTION OF EMBODIMENT

Figure 10:
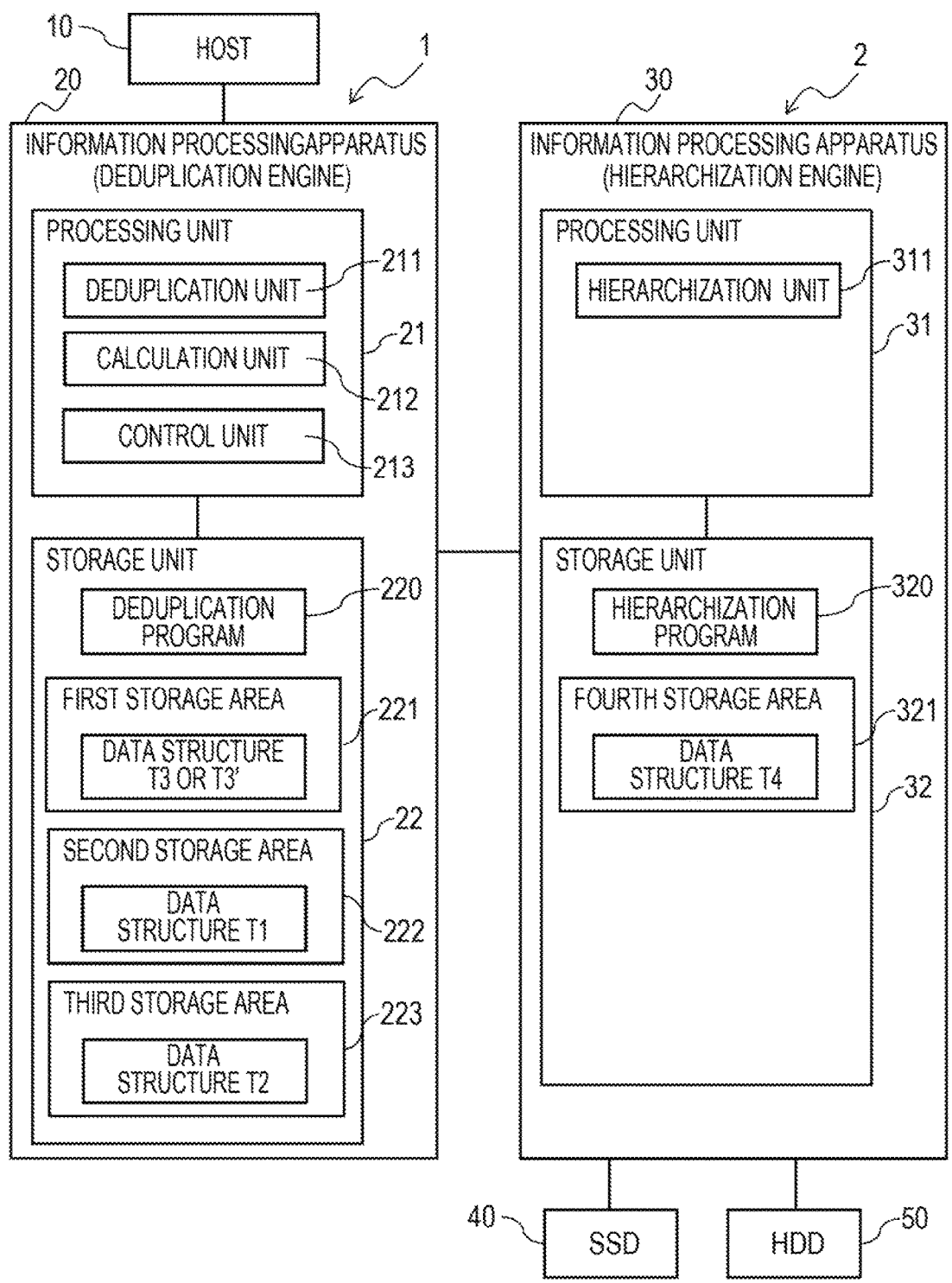
FIG. 10 is a diagram illustrating an exemplary hardware configuration and an exemplary functional configuration of a storage system according to the present embodiment.

Hereinafter, an embodiment of an information processing apparatus and a method for deduplication will be described in detail with reference to the drawings. The following embodiment is merely an example, and there is no intention to exclude application of various modifications and techniques not explicitly described in the embodiment. That is, the present embodiment may be implemented with various modifications without departing from spirit according to the present embodiment. Each drawing is not intended to include only components illustrated in the drawing, but may include other functions. The modifications may be combined with each other appropriately as long as processing contents are not contradicted.

FIGS. 1A to 1G are diagrams illustrating a process according to a related technique in a case where a hierarchization process is performed after a deduplication process. As illustrated in FIG. 1A, a process in a case where the hierarchization process is performed by a hierarchical storage after a deduplication engine performs the deduplication process in response to a write request for writing data received from a host will be described. In the hierarchical storage, for example, two types (SSD and HDD) of storage devices with different performances are included and a hierarchization engine performs the hierarchization process.

The host is provided with, for example, a data structure T1 in tabular form illustrated in FIG. 1B as an address space recognizable to the host. In the data structure T1, each of addresses designated by the host is associated with a hash value obtained from a data block to be written at the address. Hereinafter, there is a case where each of the addresses is referred to as a logical block address (LBA). As examples of an algorithm calculating a hash value includes message-digest algorithm S (MDS), secure hash algorithm (SHA)-1, SHA-256, or the like.

FIG. 1B illustrates a state where the host writes a data block of content a at addresses 0, 1, 7, and 8 and writes a data block of content b at an address 3, and writes a data block of content c at addresses 4 and 9. Hereinafter, data blocks of contents a, b, c, . . . are respectively expressed as data blocks a, b, c, . . . . In addition, hash values obtained from the data blocks a, b, c, . . . are respectively expressed as hash values A, B, C, . . . .

A memory of the deduplication engine stores therein, for example, a data structure T2 in tabular form illustrated in FIG. 1C, an address provided to the host, and an index of the data structure T2. The data structure T2 associates a hash value with a deduplication address at which a data block corresponding to the hash value is stored. The deduplication address is an address on the hierarchical storage, that is, an address provided by the hierarchical storage to the deduplication engine. In the data structure T2 illustrated in FIG. 1C, hash values A, B, and C are respectively associated with LBAs 0, 1, and 2 of the hierarchical storage. That is, as illustrated in FIG. 1D, data blocks a, b, and c are respectively associated with the LBAs 0, 1, and 2 of the hierarchical storage.

In a memory of the hierarchical storage, for example, a data structure T4 in tabular form as illustrated in FIG. 1E is stored. The data structure T4 associates, for each of LBAs of the hierarchical storage, the number (access count or access frequency) of times of access with information identifying a storage device in which a data block corresponding to the LBA is actually arranged. In FIG. 1E, for example, a device type (HDD or SSD) and an address (LBA) on the device of the device type are included in the information identifying the storage device.

Then, FIG. 1F illustrates contents (address space) of data blocks written on the actual device (HDD and SSD) in accordance with the data structure T4 illustrated in FIG. 1E. In the hierarchical storage, it is determined that the access count for an LBA 0 is 20 times and the access frequency is high, so that data block a corresponding to the LBA 0 is arranged at an LBA 0 on an SSD with high processing speed. In the hierarchical storage, it is determined that the access count for LBAs 1 and 2 are respectively 5 and 2 times and the access frequency is low, so that data blocks b and c corresponding to the LBAs 1 and 2 are respectively arranged at LBAs 0 and 1 on an inexpensive HDD with slow processing speed.

As described above, in a case where the hierarchization process is performed after the deduplication process, when writing of a data block is performed at a specific address many times, since the access frequency to each of the data blocks is low, each of the data blocks is arranged in an HDD by the hierarchization process. In addition, although the data block is to be overwritten also on the actual storage device intrinsically, since contents of the data blocks are different from each other, a new address is assigned to each of the data blocks by the deduplication technique, and each of the data blocks is written by into the storage device. For this reason, a storage area in the storage is wastefully used, the processing amount of garbage collection increases, and performance of the storage is reduced.

In order to deal with this, for example, a number (reference count) of references is managed for each of hash values and an actual data block of which the reference count becomes 0 is overwritten in the data structure T2 as illustrated in FIG. 1G, so that storage areas may be kept from being wastefully used. However, there is a problem that the amount of memory to be used increases by storing the reference count for each of the hash values.

Next, with reference to FIGS. 2A to 9, a process according to a related technique in a case where the deduplication process is performed after the hierarchization process will be described. FIGS. 2A to 2E3 are diagrams illustrating a process according to the related technique in a case where the deduplication process is performed after the hierarchization process.

As illustrated in FIG. 2A, a process in a case where the deduplication process is performed by a deduplication storage (SSD) or a deduplication storage (HDD) after the hierarchization engine performs the hierarchization process in response to a write request received from the host will be described. In each of the deduplication storages, for example, an SSD or an HDD is included as the storage device with different performances and the deduplication engine performs the deduplication process.

The host is provided with a data structure T1 in tabular form illustrated in, for example, FIG. 2B as an address space provided to the host. In the data structure T1, each of addresses designated by the host is associated with a hash value obtained from a data block to be written at the address.

FIG. 2B illustrates a state in which data blocks are written at time t=t0, t1, and t2 (t0<t1<t2). That is, FIG. 2B illustrates a state at time t=t0 in which the host writes a data block a at addresses 0, 1, 7, and 8, writes a data block b at an address 3, and writes a data block c at addresses 4 and 9, a state at time t=t1 in which the host changes the data block at the address 4 from c to d, and a state at time t=t2 in which the host changes the data block at the address 4 from d to e.

Here, it is assumed that data is not moved between the SSD and the HDD during time t=t0 to t2, and at time t=t2, for example, a data structure T4 in tabular form as illustrated in FIG. 2C is stored. At this time, data blocks written in each of the devices (SSD and HDD) are illustrated in FIGS. 2D1 to 2D3 and 2E1 to 2E3.

The data structure T4 illustrated in FIG. 2C associates the access count with information identifying the storage device in which, for each of LBAs designated by the host, a data block corresponding to the LBA is arranged.

In the data structure T4, it is determined that the access count for LBAs 1 and 8 designated by the host is 2 times and the access frequency is high. Thus, as illustrated in FIG. 2D1, data block a corresponding to the LBAs 1 and 8 is arranged at LBAs 0 and 2 on the SSD during time t=t0 to t2. In addition, it is determined that the access count for LBA 4 designated by the host is 3 times and the access frequency is high. Thus, a data block corresponding to the LBA 4 is written as c, d, and e at LBA 1 on the SSD at time t=t0, t1, and t2, respectively, as illustrated in FIG. 2D1.

Meanwhile, in the data structure T4, it is determined that the access count for LBAs 0, 3, 7, and 9 designated by the host is 1 time and the access frequency is low. Thus, as illustrated in FIG. 2E1, data blocks a, b, a, and c corresponding to the LBAs 0, 3, 7, and 9 are arranged at LBAs 0, 1, 2, and 3 on the HDD during time t=t0 to t2.

That is, by the hierarchization engine, writing to the deduplication storage (SSD) is performed as illustrated in FIG. 2D1 and writing to the deduplication storage (HDD) is performed as illustrated in FIG. 2E1.

In the deduplication storage (SSD), a data structure T2 in tabular form illustrated in FIG. 2D2 is generated and stored by the deduplication engine in response to the writing illustrated in FIG. 2D1. In the data structure T2 illustrated in FIG. 2D2, hash values A, C, D, and E are associated with LBAs 0, 1, 2, and 3 on the SSD storing data blocks a, c, d, and e corresponding to the hash values A, C, D, and E.

Similarly, in the deduplication storage (HDD), a data structure T2 in tabular form illustrated in FIG. 2E2 is generated and stored by the deduplication engine in response to the writing illustrated in FIG. 2E1. In the data structure T2 illustrated in FIG. 2E2, hash values A, B, and C are associated with LBAs 0, 1, and 2 on the HDD storing data blocks a, b, and c corresponding to hash values A, B, and C.

FIGS. 2D3 and 2E3 illustrate contents (address space) of data blocks written on the actual device (SSD and HDD) through the process described above. That is, in the SSD, data blocks a and c are written at LBAs 0 and 1 at time t=t0, data block d is written at LBA 2 at time t=t1, and data block e is written at LBA 3 at time t=t2. Meanwhile, in the HDD, data blocks a, b, and c are stored at LBAs 0, 1, and 2 during time t=t0 to t2.

Here, two problems which occur when the deduplication process is performed after the hierarchization process as illustrated in FIGS. 2A to 2E3 will be described with reference to FIGS. 3 to 9.

The first problem of a case where the deduplication process is performed after the hierarchization process as illustrated in FIGS. 2A to 2E3 occurs when the host performs writing of a data block at the same address many times. At this time, generally, writing at new address frequently occurs in a storage device (for example, SSD) with high-speed and small capacity, a capacity of the storage device runs short, and a problem that new writing is not performed without performing the garbage collection.

For example, as illustrated in FIG. 3, it is assumed that data blocks a, b, c, d, e, and f are written in this order at an address (LBA 0 in this case) designated by the host during time t=t0 to t5. Since the access count for the address 0 is increased, the hierarchization engine determines that a data block to be written at the address 0 is to be arranged in the high-speed device (SSD). Since the deduplication engine is operated in the high-speed device (SSD), if contents of data blocks successively written are slightly different from each other, the data blocks are written at different addresses as illustrated in FIG. 4. That is, although the host performs writing of different data blocks at the same address, a plurality of different addresses are used on the high-speed device (see FIG. 2D3).

The second problem occurs when the same data block is read by designating different addresses. At this time, although reading is actually performed from the same address on the same device, a problem occurs that the data block is successively arranged in the low-speed device (HDD) since the access count for each of addresses provided to the host is small.

Here, for example, it is assumed that in a state where data blocks a, b, c, a, a, and a are respectively written at addresses 0 to 5 provided to the host as illustrated in FIG. 5, the access count (read count) for each of the addresses is each value illustrated in FIG. 6. At this time, depending on the capacity of the high-speed device, as illustrated in FIG. 7, data blocks b and c written at addresses 1 and 2 are arranged in the high-speed device (SSD) and data block a written at addresses 0, 3, 4, and 5 are arranged in low-speed device (HDD). In each of the devices, since the deduplication process is performed as described with reference to FIGS. 2A to 2E3, data blocks illustrated in FIG. 8 are arranged in the high-speed device (SSD) and data blocks illustrated in FIG. 9 are arranged in the low-speed device (HDD). As a result, as illustrated in FIG. 8 and FIG. 9, the data block a with the largest access count is arranged in the low-speed device (HDD).

Embodiment

According to the present embodiment, by improving a case of performing the hierarchization process after the deduplication process and by solving a problem that occurs when the deduplication process is performed first, deduplication is realized while efficiently using the storage.

As described above, it is not preferable that reference counts for all of hash values are stored since a large amount of memory is used. In contrast, in a case where the number (write count) of times of writing, or an index value corresponding to the write count, for only a write access received from the host within a previous predetermined period is stored, memory usage is reduced in comparison with in a case where reference counts for all of hash values are stored. The index value corresponding to the write count may be referred to as an index value of the write count or an index value in some cases.

according to the present embodiment, the deduplication process is performed not for all of the data blocks, instead, an area on the actual device is newly secured for an address at which a data block is written many times, and a data block to be written at the address is always written in the secured area. With this, the deduplication process is not performed on data blocks which are successively (frequently) written at the same address. Therefore, when writing of a data block is performed at the same address many times, it is possible to realize the deduplication process while suppressing an increase in the usage of the storage area on the storage.

That is, the information processing apparatus disclosed in the present embodiment is a computer including the deduplication engine and performs, by the deduplication engine, the deduplication process on a data block when the data block is written at a specific address on the storage. At this time, the deduplication engine calculates an index value corresponding to the write count for the specific address, and determines whether to perform or hold the deduplication process on the data block depending on the calculated index value and switches performing or holding the deduplication process.

In a first storage area of the information processing apparatus, a fixed-sized data structure T3 or T3' (see FIG. 10 to FIG. 12) is newly secured. When the data block is written at the specific address, the deduplication engine refers to the data structure T3 or T3' of the first storage area. In the data structure T3 or T3' of the first storage area, a plurality of index values corresponding to respective write counts for a plurality of addresses including the specific address are respectively stored in association with the plurality of addresses. The plurality of index values are calculated with respect to the plurality of addresses When the index value calculated for the specific address belongs to an upper level among the plurality of index values, the deduplication engine holds the deduplication process on the data block. Meanwhile, in a case where the index value does not belong to the upper level among the plurality of index values, the deduplication engine performs the deduplication process on the data block.

First, a hardware configuration and a functional configuration of a storage system according to the present embodiment will be described with reference to FIG. 10. FIG. 10 is a diagram illustrating an exemplary hardware configuration and an exemplary functional configuration of the storage system according to the present embodiment. As illustrated in FIG. 10, a storage system 1 according to the present embodiment includes a host 10, an information processing apparatus 20, and a hierarchical storage 2. The hierarchical storage 2 includes an information processing apparatus 30 and storages 40 and 50.

The host 10 (host device) is an information processing apparatus (computer) that uses the hierarchical storage 2 according to the present embodiment, and is a personal computer (PC), a server, or the like. The host 10 performs write access/read access for a data block in the hierarchical storage 2 through the information processing apparatus 20. The data block is, for example, "chunk" (bit string) in a storage technique.

The information processing apparatus 20 is a computer that includes a function as the deduplication engine, and is a PC, a server, or the like. When a data block is written at the specific address on the storages 40 and 50 in the hierarchical storage 2, the information processing apparatus 20 performs the deduplication process on the data block. The specific address is an address in the hierarchical storage 2, which is provided to the host 10, and is designated by the host 10. The information processing apparatus 20 includes at least a processing unit 21 and a storage unit 22. The information processing apparatus 20 may be referred to as a deduplication engine 20.

The information processing apparatus 30 is a computer that includes a function as a hierarchization engine, and is a PC, a server, or the like. The information processing apparatus 30 performs the hierarchization process on a data block after the deduplication process performed by the information processing apparatus 20. The information processing apparatus 30 includes at least a processing unit 31 and a storage unit 32. The information processing apparatus 30 may be referred to as a hierarchization engine 30.

The processing units 21 and 31 respectively control all of the information processing apparatuses 20 and 30. The processing units 21 and 31 may be a single processor or a multi-processor. The processing units 21 and 31 may be one of, for example, a central processing unit (CPU), a micro processing unit (MPU), a digital signal processor (DSP), an application specific integrated circuit (ASIC), a programmable logic device (PLD), and a field programmable gate array (FPGA). The processing units 21 and 31 may be a combination of two or more elements of a CPU, an MPU, a DSP, an ASIC, a PLD, and a FPGA.

The storage unit 22 stores therein various data which is used for the deduplication process performed by the processing unit 21. The various data includes, for example, data structures T1, T2, and T3 (or T3') in tabular form and also includes a program or the like. The data structures T3 (or T3'), T1, and T2 are respectively stored in first to third storage areas 221, 222, and 223 of the storage unit 22. As the program, an operating system (OS) Program or an application program to be executed by the processing unit 21 may be included. The application program may include a deduplication program 220. As the storage unit 22, a random access memory (RAM) or an HDD may be used and a semiconductor storage device (SSD) such as a flash memory may be used.

Similarly, the storage unit 32 stores therein various data which is used for the hierarchization process performed by the processing unit 31. The various data includes, for example, the data structure T4 in tabular form and also includes a program or the like. The data structure T4 is stored in a fourth storage area 321 of the storage unit 32. As the program, an OS program or an application program to be executed by the processing unit 31 may be included. The application program may include a hierarchization program 320. As the storage unit 32, a RAM or an HDD may be used and a semiconductor storage device (SSD) such as a flash memory may also be used.

The program to be executed by the processing units 21 and 31 may be recorded in a non-transitory portable recording medium such as an optical disk, a memory device, a memory card, or the like. The program stored in the portable recording medium may be executed after installed in the storage unit 22 or 32 under the control of, for example, the processing unit 21 or 31. The processing units 21 and 31 may also read and execute the program directly from the portable recording medium.

The optical disk is a portable non-transitory recording medium in which data is recorded so as to be readable by reflection of light. Examples of the optical disk include a Blu-ray, a digital versatile disk (DVD), a DVD-RAM, a compact disc read-only memory (CD-ROM), a CD-Recordable (R)/ReWritable (RW), or the like. The memory device is a non-transitory recording medium including a communication function with a device connection interface (not illustrated), for example, a universal serial bus (USB) memory. The memory card is a card-type non-transitory recording medium which is coupled to the host 10 through a memory reader/writer (not illustrated) to be subject to data writing/reading.

The processing unit 21 of the information processing apparatus 20 functions as a deduplication unit 211, a calculation unit 212, and a control unit 213 to be described later by executing the deduplication program 220.

When a data block is written at the specific address (address provided to the host 10) on the storages 40 and 50, the deduplication unit 211 performs the deduplication process on the data block.

The calculation unit 212 calculates an index value corresponding to the write count for the specific address. Although the write count for the specific address may be used as the index value corresponding to the write count for the specific address, a value to be described later with reference to FIG. 11 or FIG. 12 is used in the present embodiment.

The index value calculated by the calculation unit 212 for each of the addresses is stored, in association with each of the addresses, in the data structure T3 or T3' stored in the first storage area 221 of the storage unit 22 included in the information processing apparatus 20, as illustrated in, for example, FIG. 11 or FIG. 12. That is, in the deduplication engine 20 according to the present embodiment, the fixed-sized data structure T3 or 13' is newly provided instead of the reference count illustrated in FIG. 1G.

The calculation unit 212 updates a plurality of index values stored in the data structure T3 or T3' every time writing of a data block is performed such that a difference between the plurality of index values in the data structure T3 or T3' becomes relatively small with the lapse of time.

As a calculation and update method of the index value performed by the calculation unit 212, for example, the following two methods may be considered.

First, a first method will be described with reference to FIG. 11. FIG. 11 is a diagram illustrating an example of a correspondence (data structure T3) between an address (address provided to host 10) and an index value of the write count according to the present embodiment. A procedure of an update process in the first method will be described later with reference to FIG. 17.

In the first method, the calculation unit 212 multiplies each of the plurality of index values stored in the data structure T3 by a constant x greater than 0 and less than 1. That is, all of the index values stored in the data structure T3 are multiplied by the constant. In the example illustrated in FIG. 11, 0.99 is used as the constant x.

The calculation unit 212 determines whether or not a write address (specific address) designated by the host 10 is stored in the data structure T3.

In a case where the write address is stored in the data structure T3, the calculation unit 212 adds "1" to an index value associated with the write address.

In a case where the write address is not stored in the data structure T3, the calculation unit 212 deletes, from the data structure T3, a minimum index value and an address associated with the minimum index value among the plurality of index values in the data structure T3. Then, the calculation unit 212 adds a value "1" as an index value to the data structure T3 in association with the write address.

For example, as in the data structure T3 illustrated on a left side of FIG. 11, it is assumed that a write access designating an address 10 is performed by the host 10 when an index value for an address 4 is 10.7, an index value for an address 2 is 2.2, and an index value for an address 9 is 1.4. In this case, after all of the index values are multiplied by 0.99, a minimum index value 1.4×0.99=1.386 and the address 9 associated with the minimum index value are deleted from the data structure T3, and a new index value "1" is added to the data structure T3 in association with the new designated address 10. In this way, an index value in the data structure T3 is a value equal to or greater than 0 including a decimal number.

According to the first method described above, it is possible to arrange data reflecting the most recent trend without being dragged by past information even when a trend in access from the host 10 changes.

Then, a second method will be described with reference to FIG. 12. FIG. 12 is a diagram illustrating another example of a correspondence (data structure T3') between an address (address provided to host 10) and an index value of the write count according to the present embodiment. A procedure of an update process in the second method will be described later with reference to FIG. 18.

In the second method, the calculation unit 212 determines whether or not a write address (specific address) designated by the host 10 is stored in the data structure T3'.

In a case where the write address is stored in the data structure T3', the calculation unit 212 adds "1" to an index value associated with the write address.

In a case where the write address is not stored in the data structure T3', the calculation unit 212 deletes, from the data structure T3', a minimum index value and an address associated with the minimum index value among a plurality of index values in the data structure T3'. Then, the calculation unit 212 adds a value obtained by adding "1" to the minimum index value, as an index value, to the data structure T3' in association with the write address.

For example, as in the data structure T3' illustrated on a left side of FIG. 12, it is assumed that a write access designating an address 10 is performed by the host 10 when an index value for an address 4 is 14, an index value for an address 2 is 4, and an index value for an address 9 is 2. In this case, the minimum index 2 and the address 9 associated with the minimum index value are deleted from the data structure T3', and a value "3" obtained by adding "1" to the minimum index 2 is added to the data structure T3' in association with the new designated address 10. In this way, an index value in the data structure T3' is an integer value equal to or greater than 1.

Depending on the index value calculated by the calculation unit 212 as described above, the control unit 213 determines whether to perform or hold the deduplication process on the data block and switches performing or holding the deduplication process.

When a data block is written at a specific address (designated write address) in response to a write access received from the host 10, the control unit 213 refers the data structure T3 or T3' of the first storage area 221. Then, when the index value calculated for the specific address belongs to an upper level among the plurality of index values in the data structure T3 or T3', the control unit 213 holds the deduplication process on the data block to be performed by the deduplication unit 211.

When the index value calculated for the specific address does not belong to the upper level among the plurality of index values in the data structure 13 or T3', the control unit 213 controls the deduplication unit 211 to perform the deduplication process on the data block.

A reference for determining whether or not "an index value belongs to an upper level among a plurality of index values" is set, for example, by a user by designating a proportion for defining the upper level. For example, in a case where the user designates 20% as the proportion for defining the upper level, if the number of the index values in the data structure T3 or T3' is 100 and an index value is within a range of first to 20th, it is determined that the index value "belongs to the upper level", and if the index value is equal to or less than 21th, it is determined that the index value "does not belong to the upper level".

According to the present embodiment, a data structure T1 (see FIG. 19 and FIG. 23) and a data structure T2 (see FIG. 20) are respectively stored in the second storage area 222 and the third storage area 223 of the storage unit 22.

The data structure T1 associates each of addresses designated by the host 10 with a hash value obtained from a data block to be written at the address. In the data structure T1 illustrated in FIG. 19 and FIG. 23, each of addresses is associated with a hash value.

The data structure T2 associates a hash value obtained from each of data blocks with a deduplication address at which a data block corresponding to the hash value is stored. The deduplication address is an address on the hierarchical storage 2, that is, an address provided to the deduplication engine 20 by the hierarchical storage 2.

The deduplication unit 211 according to the present embodiment performs the deduplication process using the data structures T1 and T2 described above.

When the index value calculated for the specific address belongs to the upper level among the plurality of index values in the data structure T3 or T3', the control unit 213 writes the data block to be written at a new address assigned by the hierarchical storage 2. Further, in the data structure T1, the control unit 213 overwrites a hash value, which is associated with the specific address, with the new address assigned by the hierarchical storage 2 (see FIG. 23). With this, the deduplication process is held for the data blocks, which are successively (frequently) written at the specific address, by writing the data blocks at the new address.

In this way, in a case where the index value associated with the write address belongs to the upper level of the index value of the write count in the data structure T3 or T3', the deduplication engine 20 secures an area corresponding to the address provided to the host 10 in the hierarchical storage 2 and stores the data block on the area without the deduplication process.

The processing unit 31 of the information processing apparatus 30 functions as a hierarchization unit 311 to be described below by executing the hierarchization program 320.

The storage system 1 according to the present embodiment includes the hierarchical storage 2. The hierarchical storage 2 according to the present embodiment includes an SSD 40 and an HDD 50 as the plurality of storage devices (storage units) with different performances. The storage devices are not limited to an SSD and an HDD, may include other storage devices with different performances, for example, an SCM or the like.

The hierarchization unit 311 performs the hierarchization process such that a data block corresponding to a deduplication address or a new address assigned by the hierarchical storage 2 is arranged to a storage device with performance which matches an access frequency (access count) for the deduplication address or the new address.

At this time, the hierarchization unit 311 performs the hierarchization process by using a data structure T4 (see FIG. 26) in the fourth storage area 321 of the storage unit 32. The data structure T4 associates the deduplication address or the new address with the access count for the address and information identifying a storage device in which the data block corresponding to the address is arranged. The information identifying the storage device includes, for example, a device type (HDD or SSD) and an address (LBA) on the device of the device type.

In the hierarchization process performed by the hierarchization unit 311, a data access to a data block at each of addresses is monitored for each of the addresses (addresses provided to deduplication engine 20 by hierarchical storage 2) of the hierarchical storage 2 by using the data structure T4. Then, the hierarchization unit 311 detects the access count (access frequency) for the address and rearranges the data block among the various storage devices on the basis of the detected access frequency and a predetermined policy. For example, a data block with a high access frequency is arranged in a storage device with high processing speed, that is, the SSD 40, and a data block with a low access frequency is arranged in an inexpensive storage device with slow processing speed, that is, the HDD 50.

Next, a flow of an operation by a deduplication engine according to a related technique will be described with reference to FIGS. 13 and 14 and a flow of an operation by the deduplication engine according to the present embodiment will be described with reference to FIGS. 15 to 18, in contrast to the flow of the operation by the deduplication engine according to the related technique.

The flow of a write operation by the deduplication engine according to the related technique will be described with reference to a flowchart illustrated in FIG. 13.

Figure 13:
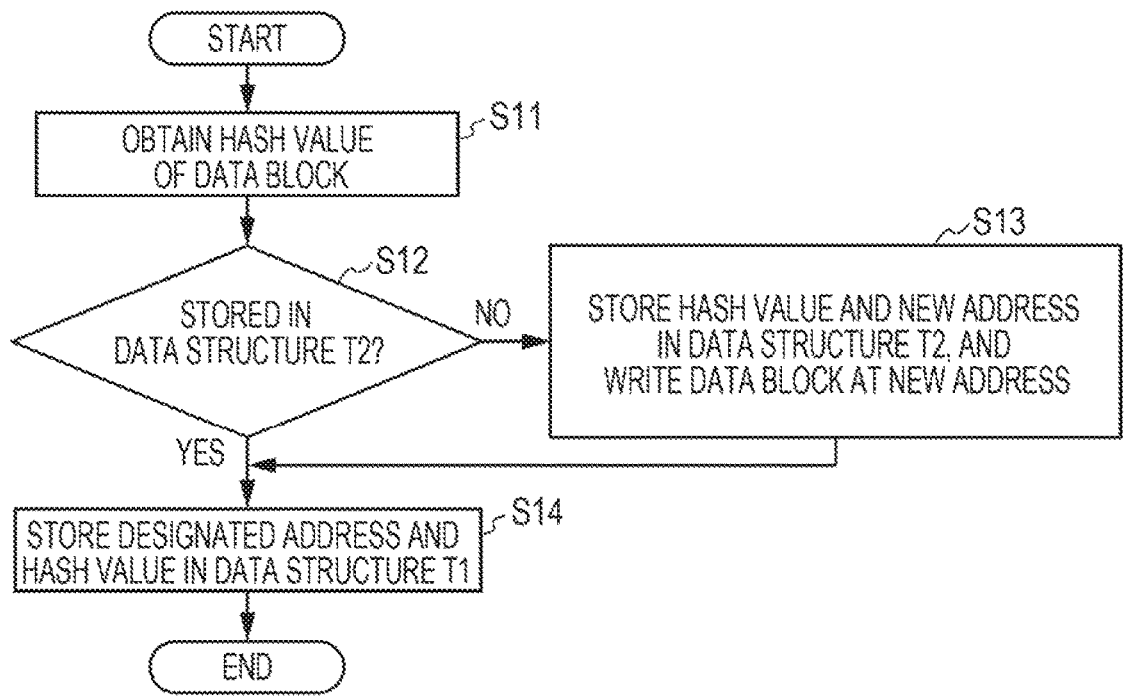
FIG. 13 is a flowchart illustrating a flow of a write operation performed by a deduplication engine according to a related technique.
Figure 14:
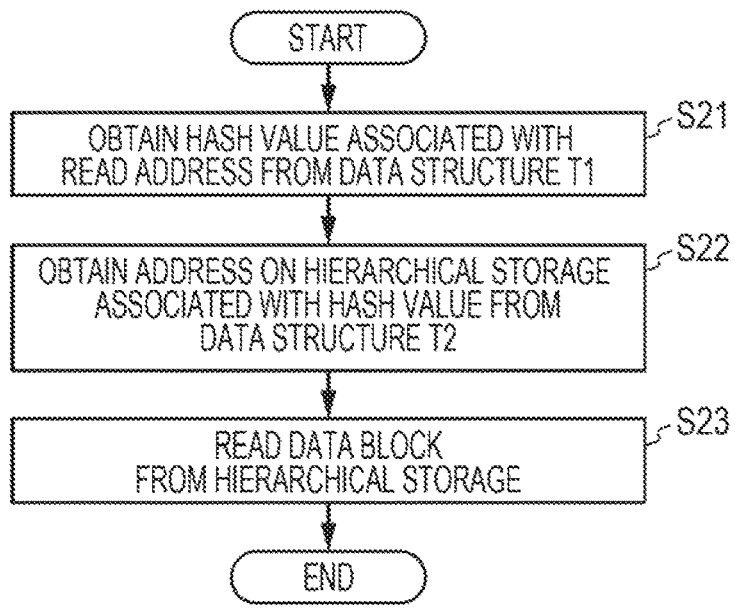
FIG. 14 is a flowchart illustrating a flow of a read operation according to a related technique.

In FIG. 13 and FIG. 14, the data structure T1 is a data structure in which each of addresses designated by the host is associated with a hash value obtained from a data block to be written at the address as illustrated in FIG. 1B. In addition, as illustrated in FIG. 1C, the data structure T2 is a data structure in which a hash value is associated with a deduplication address at which a data block corresponding to the hash value is stored. The deduplication address is an address on the hierarchical storage, that is, an address provided to the deduplication engine by the hierarchical storage.

When the deduplication engine receives a write request for writing a data block from the host, the deduplication engine calculates and obtains a hash value of the data block to be written (S11). Then, the deduplication engine determines whether or not the obtained hash value is already stored in the data structure T2 (S12).

In a case where the obtained hash value is not stored in the data structure T2 (NO in S12), a new address (LBA: deduplication address) is assigned by the hierarchical storage. Then, the deduplication engine stores the obtained hash value and the new address in association with each other in the data structure T2 and writes the data block to be written at the new address assigned by the hierarchical storage (S13).

After S13 or in a case where the obtained hash value is already stored in the data structure T2 (YES in S12), the deduplication engine stores the address (address provided to host) designated by the host and the obtained hash value in association with each other in the data structure T1 (S14) and ends the process.

A flow of a read operation according to the related technique will be described with reference to a flowchart illustrated in FIG. 14.

According to the related technique, when a read request for reading a data block is received from the host, a hash value associated with an address of a data block to be read, which is designated by the host, is searched in the data structure T1 and obtained (S21). After this, an address on the hierarchical storage, which is associated with the obtained hash value, is searched in the data structure T2 and obtained (S22). Then, a data block to be read is read from the obtained address on the hierarchical storage (S23), and the process is ended.

The flow of a write operation performed by the deduplication engine according to the present embodiment will be described with reference to a flowchart illustrated in FIG. 15.

Figure 15:
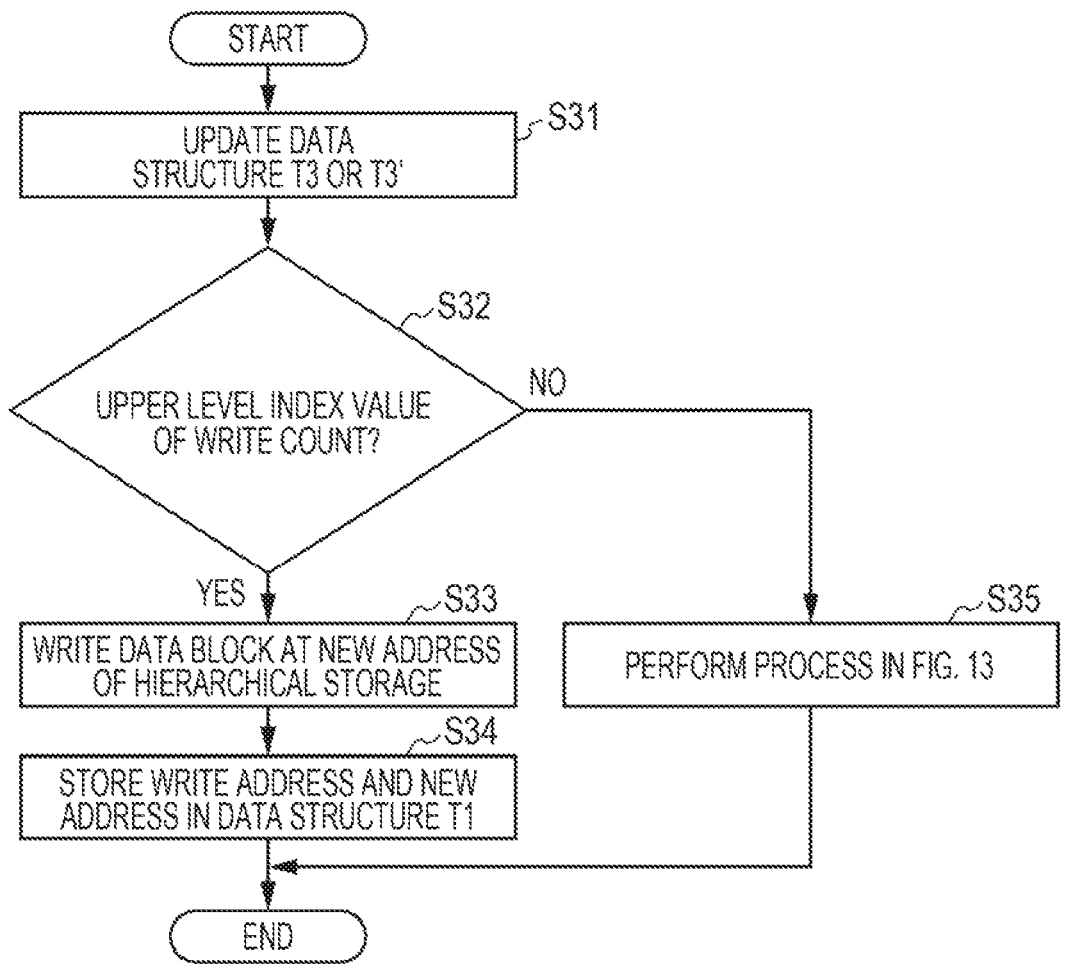
FIG. 15 is a flowchart illustrating a flow of a write operation performed by a deduplication engine according to the present embodiment.
Figure 16:
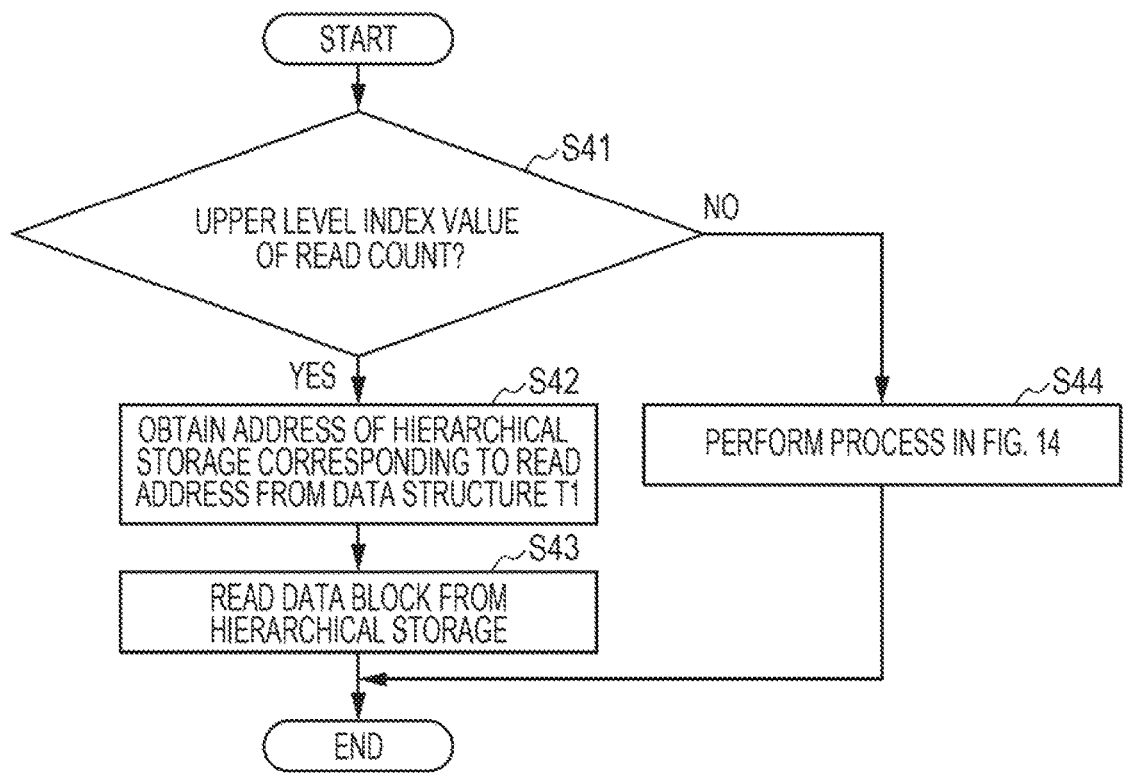
FIG. 16 is a flowchart illustrating a flow of a read operation according to the present embodiment.

In FIG. 15 and FIG. 16, it is assumed that data structures T1 and T2 are provided in the same manner as in FIG. 13 and FIG. 14. It is also assumed that, in FIG. 15 and FIG. 16, the data structure T3 or T3' described above with reference to FIG. 11 or FIG. 12 is provided.

When the deduplication engine 20 according to the present embodiment receives a write request for writing a data block from the host 10, the calculation unit 212 first calculates an index value of the write count for an address designated by the host 10 and updates the data structure T3 or T3' (Index value of the write count of each of addresses) (S31). An operation of updating the data structure T3 or T3' will be described later with reference to FIG. 17 and FIG. 18, respectively.

After updating the data structure T3 or T3', the control unit 213 of the deduplication engine 20 refers the updated data structure T3 or T3'. Then, the control unit 213 determines whether or not an index value which is calculated for a write address designated by the host 10 belongs to an upper level among a plurality of index values in the data structure T3 or T3' (S32).

In a case where the index value which is calculated for the write address belongs to the upper level (YES in S32), a new address is assigned by the hierarchical storage 2. Then, the control unit 213 writes the data block to be written at the new address assigned by the hierarchical storage 2 (S33).

The control unit 213 stores the new address assigned by the hierarchical storage 2 in the data structure T1 in association with the write address (S34; see the shaded part of FIG. 23) and ends the process. With this, the deduplication process is held for data blocks, which are successively (frequently) written to a write address, by writing the data blocks at the new address assigned by the hierarchical storage 2.

In a case where the index value which is calculated for the write address does not belong to the upper level (NO in S32), the deduplication unit 211 performs the same process as the related technique, that is, the deduplication process illustrated in FIG. 13 (S35) and ends the process.

A flow of a read operation according to the present embodiment will be described with reference to a flowchart illustrated in FIG. 16.

According to the present embodiment, when a read request for reading a data block is received from the host 10, the control unit 213 refers the data structure T3 or T3'. Then, the control unit 213 determines whether or not an index value for a read address designated by the host 10 belongs to an upper level among a plurality of index values in the data structure T3 or T3' (S41).

In a case where the index value for the read address belongs to the upper level (YES in S41), the control unit 213 searches the data structure T1 for an address on the hierarchical storage 2 corresponding the read address to obtain the address (S42; see the shaded part of FIG. 23). Then, the control unit 213 read a data block from the obtained address on the hierarchical storage 2 (S43) and ends the process.

In a case where the index value for the read address does not belong to the upper level (NO in S41), the control unit 213 performs the same process as the related technique, that is, the read process illustrated in FIG. 14 (S44) and ends the process.

Figure 17:
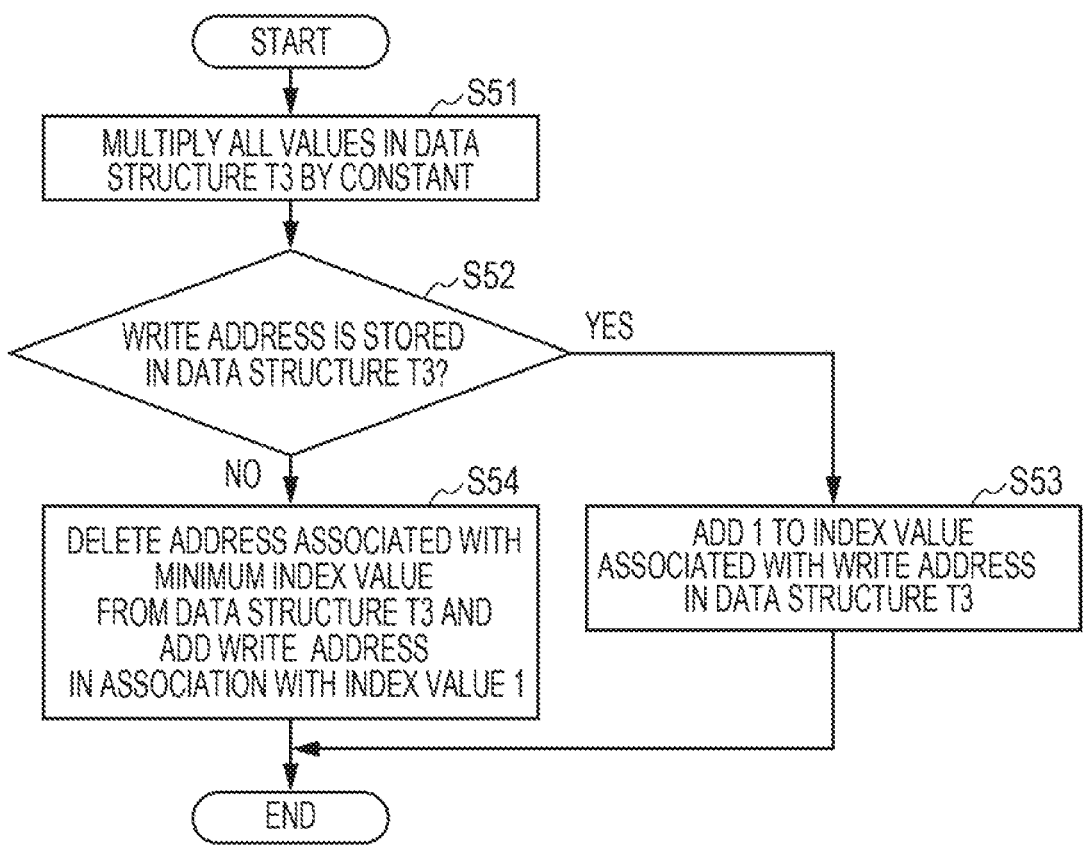
FIG. 17 is a flowchart illustrating a flow of an operation of updating an index value of a write count according to the present embodiment.

With reference to a flowchart illustrated in FIG. 17, an example of the index value of the write count according to the present embodiment, that is, a flow of an operation (S31 in FIG. 15) of updating the data structure T3 illustrated in FIG. 11 by the calculation unit 212 will be described.

When a read request for reading a data block is received from the host 10, the calculation unit 212 first multiplies each of a plurality of index values stored in the data structure T3 by a constant x ($0<x<1$; for example, 0.99). That is, all of the index values in the data structure T3 are multiplied by the constant (S51).

After this, the calculation unit 212 determines whether or not the write address designated by the host 10 is already stored in the data structure T3 (S52).

In a case where the write address is stored in the data structure T3 (YES in S52), the calculation unit 212 adds "1" to the index value associated with the write address in the data structure T3 (S53) and ends the process.

In a case where the write address is not stored in the data structure T3 (NO in S52), the calculation unit 212 deletes a minimum index value and an address associated with the minimum index value from the data structure T3. Then, the calculation unit 212 adds the write address to the data structure T3 in association with a value "1" as an index value (S54) and ends the process.

With reference to a flowchart illustrated in FIG. 18, another example of the index value of the write count according to the present embodiment, that is, a flow of an operation (S31 in FIG. 15) of updating the data structure T3' illustrated in FIG. 12 by the calculation unit 212 will be described.

When a read request for reading a data block is received from the host 10, the calculation unit 212 first determines whether or not the write address designated by the host 10 is already stored in the data structure T3' (S61).

In a case where the write address is stored in the data structure T3' (YES in S61), the calculation unit 212 adds "1" to the index value associated with the write address in the data structure T3' (S62) and ends the process.

In a case where the write address is not stored in the data structure T3' (NO in S61), the calculation unit 212 deletes a minimum index value and an address associated with the minimum index value from the data structure T3'. Then, the calculation unit 212 adds the write address to the data structure T3' in association with a value obtained by adding "1" to the minimum index value as an index value (S63) and ends the process.

Next, a flow of a detailed operation according to a related technique will be described with reference to FIGS. 19 to 22 and a flow of an detailed operation according to the present embodiment will be described with reference to FIGS. 23 to 26, in contrast to the flow of the detailed operation according to the related technique.

A situation in a case where the problem described above occurs in the related technique illustrated in FIGS. 1A to 1G will be described in detail. For example, in the related technique illustrated in FIGS. 1A to 1G, it is assumed that the write requests as illustrated in FIG. 3, that is, the write accesses of writing the data blocks a to f at the address 0 are successively (frequently) received from the host 10. The situation at this time in the related technique illustrated in FIGS. 1A to 1G is illustrated in FIGS. 19 to 22.

Figures 18, 19:
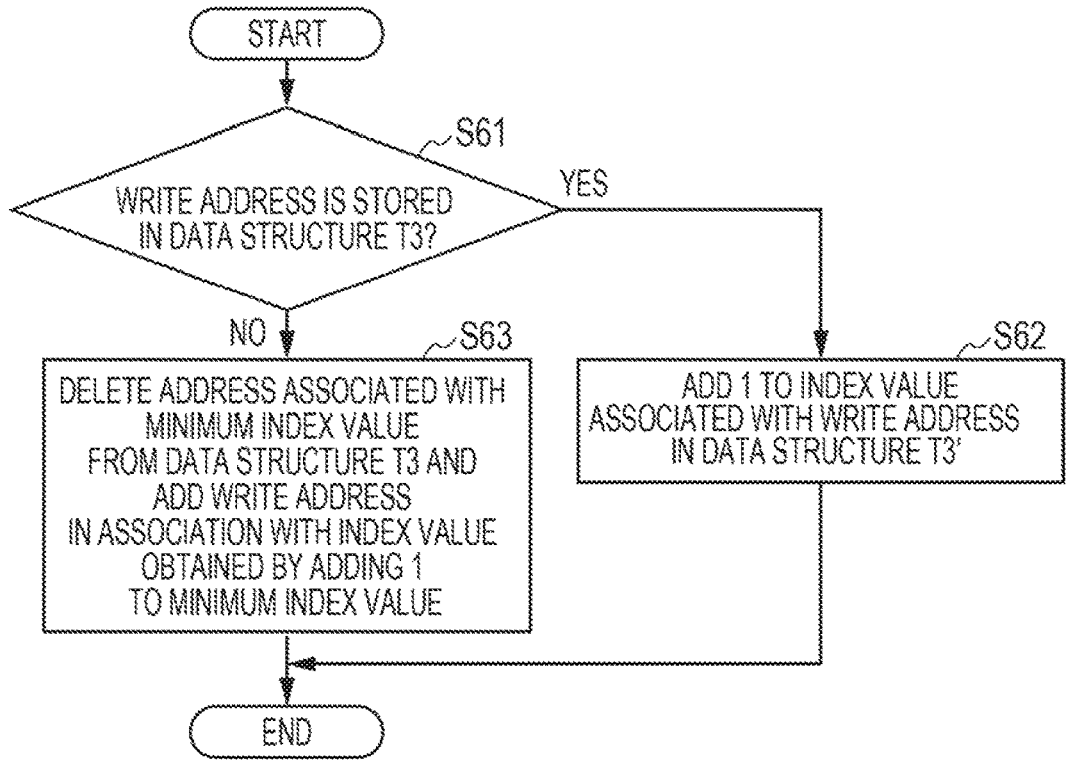
FIG. 18 is a flowchart illustrating a flow of an operation of updating an index value of a write count according to the present embodiment.
FIG. 19 is a diagram illustrating an example of a correspondence between an address and a hash value in a deduplication engine according to a related technique.

FIG. 19 is a diagram illustrating an example of a correspondence between an address (address provided to the host) and a hash value, that is, contents of the data structure T1, in the deduplication engine according to the related technique. FIG. 19 illustrates a state of the data structure T1 when the write accesses of writing the data blocks a to f to the address 0 from the host are completed. Since the data block f is finally written at the address 0, a hash value associated with the address 0 is "F" in the data structure T1 illustrated in FIG. 19 (see the shaded part).

FIG. 20 is a diagram illustrating an example of a correspondence between a hash value in the deduplication engine according to the related technique and a deduplication address (address on hierarchical storage), that is, contents of the data structure T2. FIG. 20 illustrates a state of the data structure T2 when the write accesses of writing the data blocks a to f at the address 0 from the host are completed. The data blocks d to f are successively written after the data blocks a to c. For this reason, in the data structure T2 illustrated in FIG. 20, hash values D to F of the data blocks d to f are respectively associated with addresses 3 to 5 (addresses for deduplication) assigned by the hierarchical storage (see the shaded parts).

At this time, as illustrated in FIG. 21, the data blocks d to f are respectively written at the addresses 3 to 5 (addresses provided to the deduplication engine by the hierarchical storage) on the hierarchical storage (see the shaded parts). FIG. 21 is a diagram illustrating an example of a correspondence between a deduplication address (address on the hierarchical storage) and a data block according to the related technique.

FIG. 22 is a diagram illustrating an example of a data structure T4 in the hierarchical storage according to the related technique. FIG. 22 illustrates a state of the data structure T4 when the write accesses of writing data blocks a to f at the address 0 from the host are completed. The data blocks d to f are successively written after the data blocks a to c. For this reason, in the data structure T4 illustrated in FIG. 22, addresses 3 to 5 in the data structure T4 are respectively associated with the access counts 1, 1, and 3 and device types HDD, HDD, and HDD, and addresses (LBA) on the storage device (here, HDD) 2, 3, and 4 (see the shaded parts).

In the data structure T4 illustrated in FIG. 22, only the address 0 for which the access count is 20 times is associated with an address on an SSD with high processing speed, and the data block a is arranged on the SSD. In addition, in the data structure T4 illustrated in FIG. 22, addresses 1 to 5 for which the access count is small are associated with addresses on an HDD with slow processing speed, and the data blocks b to f are arranged on the HDD.

There are two problems in the situation described above with reference to FIGS. 19 to 22.

A first problem is that although writing of a data block is frequently performed at the address 0 provided to the host as illustrated in FIG. 3 and FIG. 19, each of the data blocks is assigned to a low-speed HDD by the hierarchization process since an appearance frequency of each data block is low (see the shaded parts of FIG. 22), which causes a decrease in performance.

A second problem is that although it is enough to finally store the data block f at the address 0 provided to the host (see FIG. 25), new addresses are assigned to each of the data blocks by the deduplication process as illustrated in FIG. 21 since the contents of the data blocks d to f are different from each other. For this reason, storage areas in the hierarchical storage are wastefully used (see the shaded parts in FIG. 21), the processing amount of garbage collection increases, and performance of the hierarchical storage is reduced.

Then, a situation in which the two problems in the related technique described above are solved by employing the technique according to the present embodiment described above will be described in detail with reference to FIGS. 23 to 26.

In the present embodiment, it is also assumed that the write requests as illustrated in FIG. 3, that is, the write accesses of writing the data blocks a to f at the address 0 are successively (frequently) received from the host 10. The situation at this time in a case where the technique according to the present embodiment is applied is illustrated in FIGS. 23 to 26. It is also assumed that when time t=t3 in FIG. 3, the index value of the write count for the address 0 becomes to belong to the upper level among a plurality of index values in the data structure T3.

At this time, when time t=t3, the control unit 213 writes the data block to be written at a new address 3 (LBA; address on the hierarchical storage 2) assigned by the hierarchical storage 2. In addition, as illustrated in FIG. 23, the control unit 213 overwrites, in the data structure T1, a hash value associated with the address 0 with the new address 3 assigned by the hierarchical storage 2 (see the shaded part). FIG. 23 is a diagram illustrating an example of a correspondence between an address (address provided to host 10) and a hash value or an address on the hierarchical storage 2 in the deduplication engine 20, that is, contents of the data structure T1, according to the present embodiment.

With this, the deduplication process is held for data blocks, which are successively (frequently) written at the address 0, by writing the data blocks at the new address 3 of the hierarchical storage 2. That is, since the write count for the address 0 is large, the deduplication process is not performed on data blocks to be written at the address 0.

FIG. 24 is a diagram illustrating an example of a correspondence between an address (address provided to the host 10) and an index value of the write count, that is, contents of a data structure T3, according to the present embodiment. FIG. 24 illustrates a state of the data structure T3 when the write accesses of writing data blocks a to f at the address 0 from the host 10 are completed and the address 0 is associated with, for example, "6" belonging to the upper level as an index value of the write count (see the shaded part).

Figure 25:
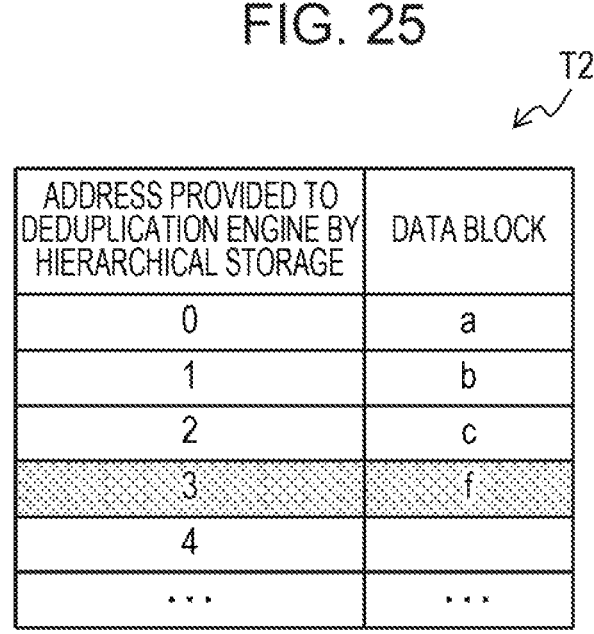
FIG. 25 is a diagram illustrating an example of a correspondence between an address provided to a deduplication engine by a hierarchical storage according to the present embodiment and a data block.

At this time, in the related technique, the data blocks d to f are respectively written at the addresses 3 to 5 of the hierarchical storage as illustrated in FIG. 21. In contrast, in the technique according to the present embodiment, by changing so as not to perform the deduplication, the data blocks d and e are sequentially overwritten and only the data block f remains at an address 3 of the hierarchical storage 2 as illustrated in FIG. 25. FIG. 25 is a diagram illustrating an example of a correspondence between an address provided to the deduplication engine 20 by a hierarchical storage 2 according to the present embodiment and a data block.

Figure 26:
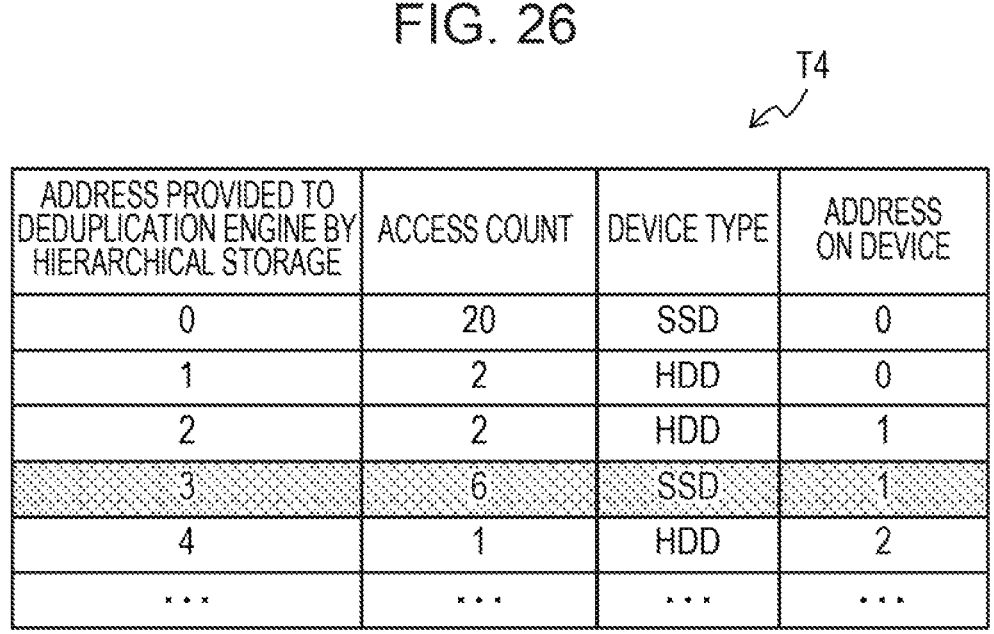
FIG. 26 is a diagram illustrating an example of a data structure in a hierarchical storage according to the present embodiment.

FIG. 26 is a diagram illustrating an example of a data structure T4 in the hierarchical storage 2 according to the present embodiment. FIG. 26 illustrates a state of the data structure T4 when the write accesses of writing data blocks a to f at the address 0 from the host 10 are completed.

In the data structure T4 according to the related technique, as illustrated in FIG. 22, all of addresses 3, 4, and 5 of the hierarchical storage are arranged on the HDD. In contrast, in the data structure T4 using the technique according to the present embodiment, as illustrated in FIG. 26, the access count for the address 3 is increased and, for example, becomes "6" due to the concentration of the writing at the address 3 on the hierarchical storage 2. Therefore, the address 3 is moved to the SSD 40 by the hierarchization process of the hierarchization unit 311 (see the shaded part).

As described above, with the technique according to the present embodiment, in a case where write accesses of writing data blocks at a specific address from the host 10 successively (frequently) occur, the deduplication process is held for the data blocks.

For this reason, storage areas in the hierarchical storage 2 may be kept from being wastefully used (see the shaded part in FIG. 25), and deduplication may be realized while efficiently using the hierarchical storage 2. That is, it is possible to solve the second problem described above which occurs in a case where the hierarchization process is performed after the deduplication process is performed first.

The access count for an address (3 in example described above) of the hierarchical storage 2 assigned by the hierarchical storage 2 is increased due to the concentration of the writing of data blocks at the address. Therefore, the address is arranged in the high-speed device (SSD 40) (see the shaded part in FIG. 26), so that performance does not reduced. That is, it is possible to solve the first problem described above which occurs in a case where the hierarchization process is performed after the deduplication process is performed first.

According to the present embodiment, the deduplication process is performed not on all of the data blocks. An area on the actual device is newly secured for an address at which data blocks are successively written and the data blocks are written in the area. With this, the deduplication process is not performed on data blocks which are successively (frequently) written at the same address. Therefore, when data blocks are successively written at the same address, it is possible to realize the deduplication process while suppressing an increase in the used areas on the storage of the hierarchical storage 2. That is, deduplication may be realized while efficiently using the hierarchical storage 2.

At this time, in a case where an index value of the write count for each address is stored for only write accesses received from the host 10 within a previous predetermined period, that is, the data structure T3 or T3' is added, memory usage may be reduced in comparison with in a case where reference counts for all of hash values are stored. That is, according to the present embodiment, deduplication may be realized while efficiently using the hierarchical storage 2 without increasing the memory usage.

According to the present embodiment, in a case where a storage is the hierarchical storage 2, it is possible to keep old data blocks from remaining in the high-speed device (SSD 40) although the access frequency is low.

According to the present embodiment, the plurality of index values stored in the data structure T3 or T3' are updated every time writing of a data block is performed so that a difference between the plurality of index values in the data structures T3 or T3' becomes relatively small with the lapse of time. With this, it is possible to arrange data reflecting the most recent trend without being dragged by past information when a trend in access from the host 10 changes.

The disclosure is not limited to the present embodiment, and the present embodiment may be variously modified.

For example, in the embodiment described above, a case where the deduplication engine 20 is applied to the hierarchical storage 2 has been described. However, the present disclosure is not limited thereto, and the deduplication engine 20 may be applied to various storages other than the hierarchical storage in the same manner to obtain the same effect as described above.

In the embodiment described above, whether or not an index value of the write count for each of addresses belongs to the upper level among the plurality of index values in the data structure T3 or T3' is determined and switching whether the deduplication process is held or performed depending on this determination result is performed. However, the present disclosure is not limited thereto, for example, whether or not an index value of the write count for each of addresses exceeds a predetermined threshold value may be determined and the deduplication process may be held or performed depending on this determination result. Also in this case, it is possible to obtain the same effect as in the embodiment described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
a memory; and
a processor coupled to the memory and the processor configured to
receive a request to write a first data block at a first address on a storage,
calculate a first index value corresponding to a number of times of writing data at the first address,
determine, on a basis of the first index value, whether to perform or hold a deduplication process on the first data block,
when it is determined to perform the deduplication process on the first data block, perform the deduplication process on the first data block,
when it is determined to hold the deduplication process, hold the deduplication process by performing a process to cause the first data block to be stored in a new address in the storage,
store a plurality of addresses in a first storage area in association with respective index values corresponding to numbers of times of writing data at the plurality of addresses,
determine whether the first index value belongs to an upper level of the index values stored in the first storage area,
hold the deduplication process on the first data block upon determining that the first index value belongs to the upper level of the index values,
update the index values stored in the first storage area such that differences between the index values become smaller with a lapse of time,
determine whether the first address is stored in the first storage area,
add, upon determining that the first address is stored in the first storage area, 1 to an index value associated with the first address in the first storage area, and
delete, upon determining that the first address is not stored in the first storage area, a minimum index value among the index values and an address associated with the minimum index value from the first storage area and store the first address in the first storage area in association with an index value obtained by adding 1 to the minimum index value.

2. The information processing apparatus according to claim 1, wherein the processor is configured to perform the deduplication process on the first data block upon determining that the first index value does not belong to the upper level of the index values.

3. The information processing apparatus according to claim 1, wherein the processor is configured to
multiply the respective index values stored in the first storage area by a constant number which is greater than 0 and less than 1,
determine whether the first address is stored in the first storage area,
add, upon determining that the first address is stored in the first storage area, 1 to an index value associated with the first address in the first storage area, and
delete, upon determining that the first address is not stored in the first storage area, a minimum index value among the index values and an address associated with the minimum index value from the first storage area and store the first address in the first storage area in association with an index value having a value 1.

4. The information processing apparatus according to claim 1, wherein the processor is configured to
store the plurality of addresses in a second storage area in association with respective hash values obtained from data blocks to be written to the plurality of addresses,
store the hash values corresponding to the plurality of addresses in a third storage area in association with respective deduplication addresses at which the data blocks corresponding to the hash values are stored,
perform the deduplication process by using the second storage area and the third storage area, and
hold the deduplication process on the first data block by
writing the first data block at the new address which is assigned by the storage,
replacing, with the new address, a hash value stored in the second storage area in association with the first address, and
writing, at the new address, data blocks to be written subsequently at the first address.

5. The information processing apparatus according to claim 4, wherein
the storage is a hierarchical storage including a plurality of storage units with different performances, and
the processor is configured to perform hierarchization by arranging a second data block in a first storage unit among the plurality of storage units, the second data block being to be written at a second address which is one of the deduplication addresses or the new address, the first storage unit having performance corresponding to a first access frequency of accessing the second address.

6. The information processing apparatus according to claim 5, wherein the processor is configured to
store the second address in a fourth storage area in association with the first access frequency and information identifying the first storage unit, and
perform the hierarchization by using the fourth storage area.

7. A non-transitory computer-readable recording medium having stored therein a program that causes a computer to execute a process, the process comprising:
receiving a request to write a first data block at a first address on a storage;
calculating a first index value corresponding to a number of times of writing data at the first address;
determining, on a basis of the first index value, whether to perform or hold a deduplication process on the first data block;
when it is determined to perform the deduplication process on the first data block, performing the deduplication process on the first data block;
when it is determined to hold the deduplication process, holding the deduplication process by performing a process to cause the first data block to be stored in a new address in the storage;
storing a plurality of addresses in a first storage area in association with respective index values corresponding to numbers of times of writing data at the plurality of addresses;

determining whether the first index value belongs to an upper level of the index values stored in the first storage area;

holding the deduplication process on the first data block upon determining that the first index value belongs to the upper level of the index values;

updating the index values stored in the first storage area such that differences between the index values becomes smaller with a lapse of time;

determining whether the first address is stored in the first storage area;

adding, upon determining that the first address is stored in the first storage area, 1 to an index value associated with the first address in the first storage area; and deleting, upon determining that the first address is not stored in the first storage area, a minimum index value among the index values and an address associated with the minimum index value from the first storage area and store the first address in the first storage area in association with an index value obtained by adding 1 to the minimum index value.

8. The non-transitory computer-readable recording medium according to claim 7, the process comprising:

performing the deduplication process on the first data block upon determining that the first index value does not belong to the upper level of the index values.

9. The non-transitory computer-readable recording medium according to claim 7, the process comprising:

multiplying the respective index values stored in the first storage area by a constant number which is greater than 0 and less than 1;

determining whether the first address is stored in the first storage area;

adding, upon determining that the first address is stored in the first storage area, 1 to an index value associated with the first address in the first storage area; and deleting, upon determining that the first address is not stored in the first storage area, a minimum index value among the index values and an address associated with the minimum index value from the first storage area and store the first address in the first storage area in association with an index value having a value 1.

10. A method comprising:

by at least one processor;

receiving a request to write a first data block at a first address on a storage;

calculating a first index value corresponding to a number of times of writing data at the first address;

determining, on a basis of the first index value, whether to perform or hold a deduplication process on the first data block;

when it is determined to perform the deduplication process on the first data block, performing the deduplication process on the first data block;

when it is determined to hold the deduplication process, holding the deduplication process by performing a process to cause the first data block to be stored in a new address in the storage;

storing a plurality of addresses in a first storage area in association with respective index values corresponding to numbers of times of writing data at the plurality of addresses;

determining whether the first index value belongs to an upper level of the index values stored in the first storage area;

holding the deduplication process on the first data block upon determining that the first index value belongs to the upper level of the index values;

updating the index values stored in the first storage area such that differences between the index values becomes smaller with a lapse of time;

determining whether the first address is stored in the first storage area;

adding, upon determining that the first address is stored in the first storage area, 1 to an index value associated with the first address in the first storage area; and deleting, upon determining that the first address is not stored in the first storage area, a minimum index value among the index values and an address associated with the minimum index value from the first storage area and store the first address in the first storage area in association with an index value obtained by adding 1 to the minimum index value.

11. The method according to claim 10, comprising:

multiplying the respective index values stored in the first storage area by a constant number which is greater than 0 and less than 1;

determining whether the first address is stored in the first storage area;

adding, upon determining that the first address is stored in the first storage area, 1 to an index value associated with the first address in the first storage area; and deleting, upon determining that the first address is not stored in the first storage area, a minimum index value among the index values and an address associated with the minimum index value from the first storage area and store the first address in the first storage area in association with an index value having a value 1.

* * * * *